Patented May 22, 1934

1,960,220

UNITED STATES PATENT OFFICE 1,960,220

COATED MATERIAL

Horace H. Hopkins, Ridley Park, Pa., assignor to E. I. du Pont de Nemours & Company, Wilmington, Del., a corporation of Delaware No Drawing. Application June 12, 1930
Serial No. 460,797

10 Claims. (Cl. 91—68)

This invention relates to improved coated materials, and more particularly to decorated materials embodying a synthetic resin print paint decoration.

In the usual practice of manufacture, certain types of coated materials are made by the application of print paint liquids by means of a print machine to a built-up, saturated felt base, to a linoleum base, or to other base material, to form a wearing and decorative surface. These print liquids generally contain, besides driers and volatile thinners, bodied or blown oils, which are blended with oleo-resinous varnishes to give products of varying degrees of gloss, hardness, flexibility, alkali resistance, and durability. Up to the time of the making of the invention embodied in my co-pending application, Serial Number 299,638, filed August 14, 1928, of which the present application is in part a continuation it had been impossible to produce a coating on a linoleum or other floor covering which would possess the desirable qualities of quick drying, alkali resistance, and toughness of film. The coatings heretofore used were also objectionable because the lighter shades became markedly discolored during the usual stoving or baking process by which the coated material was dried after printing.

This invention has as an object the elimination of the difficulties heretofore encountered in the manufacture of floor coverings, wall coverings, oilcloth and the like. A further object is to produce an improved coated material which will have a surface effectively resistant to the action of soaps, soap powders, and other alkali containing materials. A further object is to produce a coated material having a tough, durable wearing surface. A more specific object is the production of improved floor coverings. A still more specific object is to produce a floor covering having a wearing surface which will not become discolored during the usual baking process. Other objects will appear hereinafter.

These objects are accomplished by the following invention, which comprises coating a built-up, impregnated felt base material, a linoleum, a fabric, or other base material, with a paint, the vehicle of which is a modified polyhydric alcohol-polybasic acid resin. These substances may be generally defined as the esters derived by esterifying one or more polyhydric alcohols with one or more polybasic acids, and one or more modifying ingredients, such as drying oils, semi-drying oils and monobasic acids derived by hydrolysis of drying oils or semi-drying oils, with or without the addition of natural resins or resin acids. Inasmuch as the properties of the modified polyhydric alcohol-polybasic acid resins vary considerably according to the ratio of the modifying oils or oil acids used, it is necessary to choose those products which are best adapted for producing flexible, quick drying and durable coatings. According to this invention, I prefer to use resins containing from 40 to 85% of oil glyceride. After the preparation of the resins they are cut with aromatic or aliphatic hydrocarbons and the desired pigment incorporated in any des'red quantity to produce a paint liquid.

Examples of the preparation of suitable resins falling within the scope of this invention are as follows:

Example 1

176 parts by weight of glycerol, 288 parts by weight of phthalic anhydride, 402 parts by weight of acids obtained by hydrolysis of linseed oil, and 134 parts by weight of acids obtained by hydrolysis of China-wood oil are heated together in an atmosphere of carbon dioxide. The reaction is most conveniently carried out in a vessel of such shape and construction that air may be excluded from the reaction mixture, as by passing a stream of carbon dioxide through the vessel. The phthalic anhydride which escapes from the hot reaction mixture may be condensed on the cool upper portion of the vessel and this sublimate may be returned to the mix by a suitable scraping device. The temperature of the mix is gradually raised to 220° C., care being taken that the evolution of steam from the reaction mixture does not become so rapid as to cause loss of material by foaming. The material is kept at 220° C., a slow stream of carbon dioxide being constantly passed through the reaction vessel in such a way as to protect the reaction mixture from the air. After 7 to 10 hours, the reaction has practically reached completion, but a small amount of free phthalic anhydride may still remain in the reaction mixture. This may be removed by bubbling a rapid stream of carbon dioxide through the molten resin maintained at a temperature of 200–220° C.

Example 2

47.76 parts by weight of linseed oil, 15.44 parts by weight of China-wood oil and 9.69 parts by weight of glycerol are placed in a closed kettle provided with a reflux condenser and heated at 225° C., accompanied by continual stirring, until the mass is homogeneous. 22.44 parts by weight of phthalic anhydride and 4.67 parts by weight of rosin are then added and heating is continued at 225° C. for about six hours, or until the acid number is approximately 10.

Example 3

48.93 parts by weight of linseed oil, 16.31 parts by weight of China-wood oil, 8.47 parts by weight of glycerol and 1.71 parts by weight of ethylene glycol are placed in a closed kettle provided with a reflux condenser and heated at 225° C., accompanied by continual stirring, until the mass is homogeneous. 24.58 parts by weight of phthalic anhydride are then added and heating is continued at 225° C. for about 6 to 8 hours, or until the acid number is approximately 10.

Example 4

14.75 parts by weight of glycerol, 19.86 parts by weight of phthalic anhydride, 45.66 parts by weight of linseed oil acids, 15.22 parts by weight of China-wood oil acids and 4.51 parts by weight of rosin are heated together at 225° C. in a closed kettle provided with a reflux condenser, accompanied by continual stirring, for about 6–8 hours, or until the acid number is approximately 8 to 10.

Example 5

1.50 parts by weight of ethylene glycol, 14.34 parts by weight of glycerol, 23.45 parts by weight of phthalic anhydride, 45.53 parts by weight of linseed oil acids and 15.18 parts by weight of China-wood oil acids are heated together at 225° C. in a closed kettle provided with a reflux condenser, accompanied by continual stirring, for about 8–10 hours, or until the acid number is approximately 10.

Example 6

14.60 parts by weight of glycol, 19.87 parts by weight of phthalic anhydride, 45.76 parts by weight of linseed oil acids and 15.25 parts by weight of China-wood oil acids and 4.52 parts by weight of rosin are heated together at 225° C. in a closed kettle provided with a reflux condenser, accompanied by continual stirring, for about 8–10 hours, or until the acid number is approximately 10.

Example 7

14.71 parts by weight of glycol, 24.34 parts by weight of phthalic anhydride, 44.52 parts by weight of linseed oil acids and 16.43 parts by weight of China-wood oil are heated together at 225° C. in a closed kettle provided with a reflux condenser, accompanied by continual stirring, for about 8–10 hours, or until the acid number is approximately 10.

Examples of print paint compositions falling within the scope of this invention are as follows:

Example 8

| | Parts by weight |
|---|---|
| Lithopone | 65 |
| Resin of Example 1 | 25 |
| Solvent | 5 |
| Total | 95 |

The solvent used in this example may be either aromatic or aliphatic hydrocarbons, or a mixture of these.

Example 9

| | Parts by weight |
|---|---|
| Lithopone | 50 |
| Zinc oxide | 10 |
| Resin of Example 5 | 25 |
| Solvent naphtha | 15 |
| Total | 100 |

Example 10

| | Parts by weight |
|---|---|
| Lithopone | 60 |
| Resin of Example 5 | 25 |
| Mixing varnish | 0.5 |
| Solvent naphtha | 14.5 |
| Total | 100.0 |

The above mixing varnish may be prepared by heating 100 parts by weight of China-wood oil to 232° C., adding 6 parts by weight of litharge, and continuing the heating to 302° C. This temperature is maintained until the oil is heavily bodied when 50 parts by weight of rosin are quickly added and the heating stopped. When the mixture has cooled to 232° C. it is thinned with 40 parts by weight of mineral spirits. Ordinary equipment in a varnish plant is suitable.

Example 11

| | Parts by weight |
|---|---|
| Lithopone | 60.0 |
| Resin of Example 5 | 25.0 |
| Aluminum stearate | 0.3 |
| Commercial dipentene | 14.5 |
| Total | 99.8 |

The aluminum stearate is added to the mixture of ingredients before the grind, and is thoroughly incorporated during the grinding operation.

Example 12

| | Parts by weight |
|---|---|
| Lithopone | 50.0 |
| Resin of Example 3 | 30.0 |
| Aluminum palmitate | 0.5 |
| Mixing varnish | 0.5 |
| Mineral spirits | 10.0 |
| Solvent naphtha | 9.0 |
| Total | 100.0 |

Example 13

| | Parts by weight |
|---|---|
| Lithopone | 50.0 |
| Zinc oxide | 15.0 |
| Calcium oleate | 0.3 |
| Resin of Example 3 | 25.0 |
| Mixing varnish | 0.4 |
| Mineral spirits | 9.3 |
| Total | 100.0 |

Example 14

| | Parts by weight |
|---|---|
| Ultramarine blue | 25.0 |
| Lithopone | 25.0 |
| English whiting | 6.0 |
| Aluminum stearate | 0.3 |
| Resin of Example 6 | 34.0 |
| Mixing varnish | 0.4 |
| Mineral spirits | 9.3 |
| Total | 100.0 |

The ingredients used in the manufacture of the above coating compositions, as well as other coating compositions falling within the scope of my invention, are made into paint by grinding them to suitable fineness in any suitable type of paint mill. Additional solvent may be added to adjust the consistency of the paint to the most satisfactory condition for its application to the base material, after which it is applied to the impregnated felt base, linoleum base, or other base material, by any well known printing process. After application in the printing machine, the goods are hung in stationary ovens and stoved at temperatures ranging from 60° C. to 71° C. for a period of 20 to 70 hours, according to the nature of the resin used as a vehicle and the degree of hardness desired. The coated material is then ready for use.

Although the above examples are limited to resins made by the use of glycol or glycerol as one of the reacting ingredients, I desire to have it understood that the modifying agents are not limited to those disclosed. Similarly, although the acid number of the resulting resins has been stated in the examples, I desire to have it understood that the acid number may be varied over wide limits, although the preferred limits are acid numbers between 4 and 20.

The preferred range of modifying oil is between 40 and 85% of the resin ester, expressed as oil glyceride, and the preferred range of resin acids is from 5 to 35%, but the exact proportions in any given case are adjusted to impart the desired film and working properties to the coating composition.

Furthermore, although the specific solvents mentioned in the examples of print paints given are limited to solvent naphtha, mineral spirits and commercial dipentene, other solvents for the resin in the general class of aromatic terpene and aliphatic hydrocarbons, or mixtures of these, may be used as thinner for the print paints.

Likewise, although the pigments given in the above examples are limited to lithopone, zinc oxide and ultramarine blue, I desire to have it understood that any other pigments, or combinations of pigments, may be used, including various blacks, such as carbon, lamp, bone or drop black, iron oxides, siennas, umbers, ochres, Prussian blue, chrome greens, chrome yellow, chrome orange, lakes and toners, as well as various fillers and extenders.

Any suitable additional materials, such as driers, bodied or blown oils, and oleo-resinous varnishes, may be added to the print paint compositions falling within the scope of this invention where desired, to give products of varying degrees of gloss, hardness, flexibility, flow or false body.

The improved coated materials produced as described above, and particularly my improved floor coverings, possess a surface which is substantially completely resistant to the attack of soaps, soap powders, or other alkali containing materials. Another feature of these materials which gives them marked superiority over the ordinary goods of this type is the fact that the modified polyhydric alcohol-polybasic acid resin coating is subject to practically no discoloration during the stoving process when the lighter shades are employed. Heretofore it has been practically impossible to produce a floor covering in the lighter shades, the wearing surface of which was not discolored during manufacture, but with the floor coverings of this invention this difficulty is practically eliminated. The coated surface is also tough and durable, and possesses the desired quality of flexibility.

By the expression "a reactive material containing drying oil acids", as used herein, I mean to include either drying oils themselves, acids obtained by the hydroylsis of drying oils, or one or more drying oil acids obtained in any other manner.

By the term "resin acids", as used herein, I mean either natural resins, such as rosin, resin acids, such as abietic, or the acids obtained from such resins.

As many apparently widely different embodiments of this invention may be made without departing from the spirit thereof, it is to be understood that I do not limit myself to the foregoing examples, proportions or description except as indicated in the following patent claims.

I claim:

1. In a decorated material of the group which consists of floor coverings, wall coverings and oil cloth, the combination of a base material and a print paint decoration comprising an ester of glycol, a polybasic acid and a reactive material containing drying oil acids.

2. The decorated material of claim 1, in which the ester of the coating composition contains resin acids.

3. The decorated material of claim 1, in which the ester of the coating composition contains rosin.

4. The decorated material of claim 1, in which the coating composition contains a pigment.

5. The decorated material of claim 1, in which the ester of the coating composition contains resin acids, and in which the coating composition contains a pigment.

6. In a floor covering, the combination of a base material and a print paint decoration comprising an ester of glycol, a polybasic acid and a reactive material containing drying oil acids, said ester containing from 40 to 85% of oil expressed as oil glyceride.

7. The floor covering of claim 6, in which the ester of the coating composition contains resin acids.

8. The floor covering of claim 6, in which the ester of the coating composition contains rosin.

9. The floor covering of claim 6, in which the coating composition contains a pigment.

10. The floor covering of claim 6, in which the ester of the coating composition contains resin acids, and in which the coating composition contains a pigment.

HORACE H. HOPKINS.